United States Patent [19]

Meyer

[11] Patent Number: 4,841,225
[45] Date of Patent: Jun. 20, 1989

[54] CAPACITIVE SENSOR FOR MEASURING A DISPLACEMENT

[76] Inventor: Hans U. Meyer, 42, rue de Lausanne, 1110 Morges, Switzerland

[21] Appl. No.: 102,042

[22] Filed: Sep. 28, 1987

[30] Foreign Application Priority Data

Nov. 13, 1986 [CH] Switzerland ............. 4535/86-7

[51] Int. Cl.[4] ............................................. G01R 27/26
[52] U.S. Cl. ............................... 324/61 R; 340/870.37
[58] Field of Search ................... 324/61 R; 340/870.37

[56] References Cited

U.S. PATENT DOCUMENTS

| | | | |
|---|---|---|---|
| 3,857,092 | 12/1974 | Meyer | 324/61 R |
| 4,206,401 | 6/1980 | Meyer | 324/61 R |
| 4,420,754 | 12/1983 | Andermo | 340/870.37 |
| 4,437,055 | 3/1984 | Meyer | 324/61 P |
| 4,449,179 | 5/1984 | Meyer | 324/61 R |

Primary Examiner—Reinhard J. Eisenzopf
Assistant Examiner—Anthony L. Miele
Attorney, Agent, or Firm—Young & Thompson

[57] ABSTRACT

A capacitive sensor for measuring a displacement comprises a slide carrying groups of emitting electrodes (1 to 32) disposed facing receiving electrodes (51 and 52) carried by a scale. A periodic configuration of signals is applied to the emitting electrodes by electronic circuits (60 to 65h) which permit a separate switching of each group of electrodes. There is thus obtained a more precise definition of the signals received by the receiving electrodes situated facing the scale and thus a greater precision of the measurement of displacements.

2 Claims, 4 Drawing Sheets

FIG. 2

| | G1 | G2 | G3 | G4 | G5 | G6 | G7 | G8 |
|---|---|---|---|---|---|---|---|---|
| | 0 | 1 | 1 | 1 | 1 | 0 | 0 | 0 |
| | 0 | 0 | 1 | 1 | 1 | 1 | 0 | 0 |
| | 0 | 0 | 0 | 1 | 1 | 1 | 1 | 0 |
| | 0 | 0 | 0 | 0 | 1 | 1 | 1 | 1 |
| | 1 | 0 | 0 | 0 | 0 | 1 | 1 | 1 |
| | 1 | 1 | 0 | 0 | 0 | 0 | 1 | 1 |
| | 1 | 1 | 1 | 0 | 0 | 0 | 0 | 1 |
| | 1 | 1 | 1 | 1 | 0 | 0 | 0 | 0 |

| | | | | | | | | |
|---|---|---|---|---|---|---|---|---|
| Q4 | 0 | 1 | 0 | 1 | 0 | 1 | 0 | 1 |
| Q5 | 0 | 0 | 1 | 1 | 0 | 0 | 1 | 1 |
| Q6 | 0 | 0 | 0 | 0 | 1 | 1 | 1 | 1 |

FIG. 4

| | a | b | c | d | e | f | g | h | i | j |
|---|---|---|---|---|---|---|---|---|---|---|
| Q1 | 0 | 1 | 0 | 1 | 0 | 1 | 0 | 1 | 0 | 0 |
| Q2 | 0 | 0 | 1 | 1 | 0 | 0 | 1 | 1 | 0 | 0 |
| Q3 | 0 | 0 | 0 | 0 | 1 | 1 | 1 | 1 | 0 | 0 |
| Q4 | 0 | 0 | 0 | 0 | 0 | 0 | 0 | 0 | 1 | 0 |
| Q5 | 0 | 0 | 0 | 0 | 0 | 0 | 0 | 0 | 0 | 1 |
| Q6 | 0 | 0 | 0 | 0 | 0 | 0 | 0 | 0 | 0 | 0 |

CAPACITIVE SENSOR FOR MEASURING A DISPLACEMENT

The invention concerns a capacitive sensor for measuring a displacement, comprising a scale having a series of receiving electrodes spaced apart by a pitch T along the direction of displacement and a slide situated facing the scale and comprising a series of emitting electrodes having a pitch of T/N along the direction of the displacement.

BRIEF DESCRIPTION OF THE PRIOR ART

In a known electronic control device, described in the patent CH No. 539,837, a periodic configuration of electric signals on the emitting electrodes is adjusted by increments equal to the pitch T/N of the emitting electrodes along the direction of displacement, then the amplitude of the signals is adjusted until the coupled signal is reduced to zero on the electrodes of the scale. The position is given by the sum of the increments and the interpolation value.

As the amplitude of the control signal provides the degree of interpolation, and thus the position, a digital-analog converter is necessary.

In another known device (GB No. 009 944) two distinct solutions are proposed so as to permit positional determination more precise than the pitch T/N of the electrodes of the slide. The first solution provides sinusoidal signals in combination with receiving electrodes of sinusoidal shape that are difficult to realize; moreover, the effect of fringe fields is not taken into account. The second solution provides rectangular signals, the linear relation between phase and position being obtained by the phase of a "detection window" integrating the signal received over a given time and the output of which is maintained at zero by a phase controller.

SUMMARY OF THE INVENTION

The devices mentioned above, as well as several other known devices, have their smallest purely digital increment limited to the order of magnitude T/N of the pitch of an electrode of the slide and thus require electronic analog interpolation means, the ratio between the pitch of an electrode of the slide and the resolution to be obtained is higher. The object of the present invention is to increase the precision of measuring in a relatively simple manner. To this end, the sensor is characterized in that the series of electrodes of the slide is electrically divided in M groups of N adjacent electrodes, electronic means permitting generating on each group of two signal distributions spatially periodical and mutually shifted, a control circuit being provided for modifying the configuration of the signals on the emitting electrodes by switching the groups from one of the signal distributions to the other.

The advantage of this technique is in permitting a digital increment much smaller than the pitch T/N of a emitting electrode, thus avoiding, in the majority of cases, the necessity of an analog interpolation.

Specifically, the described electronic means permit separately switching each group of N emitting electrodes instead of switching all of the emitting electrodes as described in the state of the art.

Given M groups of N emitting electrodes, the shifting of one group by T/N, corresponding to one electrode pitch, along the direction of measurement, gives rise to a mean equivalent displacement of T/(M·N) of the entirety of electrodes, provided that N be sufficiently great (8 or more) for the degree of variation of the measuring capacities to remain constant over a path T/N and for the measuring capacities to be the same for the M groups of emitting electrodes.

If this latter criterion is not satisfied, a suitable distribution of the control signals to the different groups overcomes the problem. This is an additional reason why the offset of the configurations between groups must remain minimal, so as to minimize the influence of local disturbances.

BRIEF DESCRIPTION OF THE FIGURES

The accompanying drawings show embodiments and explanatory diagrams of the sensor that is the object of the invention:

FIG. 2 shows a truth table of the outputs of a signal generator.

FIG. 4 shows signal configurations on the emitting electrodes.

DETAILED DESCRIPTION

Figure 1:
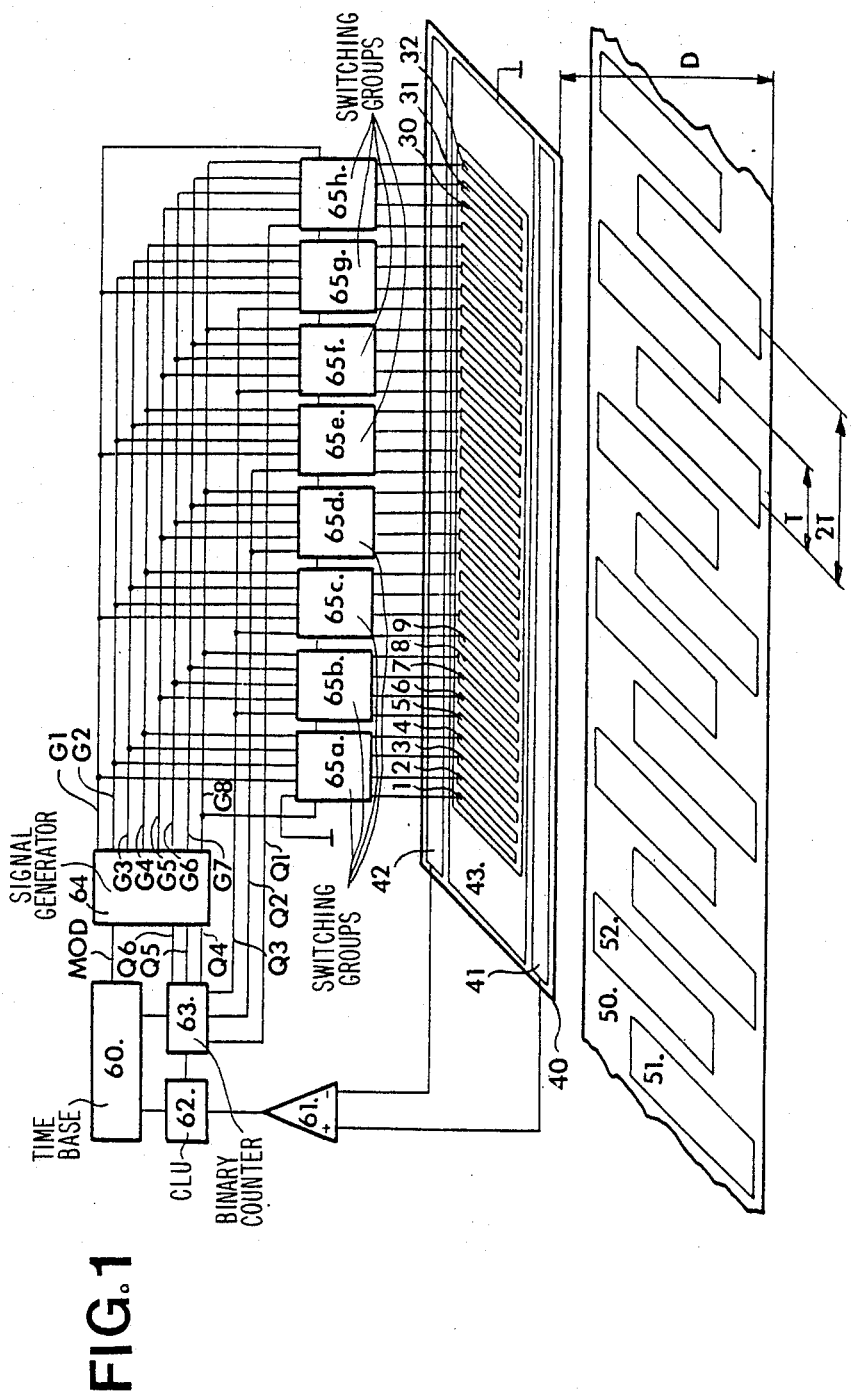
FIG. 1 shows a diagram of a sensor according to the invention.

A diagram of a sensor according to the invention is shown in FIG. 1. An electronic portion, described below, generates a signal at each emitting electrodes 1 to 32 of a slide 40. A scale (50) is facing the slide (40). The distance D between scale and slide is exaggerated in the drawing, for ease of understanding. The scale contains odd receiving electrodes 51 and even receiving electrodes 52 receiving the signal of the emitting electrodes facing them. Two collecting electrodes 41 and 42 receive respectively the signal from the odd 51 and even 52 receiving electrodes.

The field generated by the emitting electrodes is approximately periodic along the direction of measurement, the mean period being about 2T. An example of the possible configuration of the field will be given below.

The signals received at the odd electrodes will thus be approximately opposite in phase with the signals received at the even electrodes. A shielding electrode 43 prevents direct coupling between the emitting and collecting electrodes. The collecting electrodes 41, 42 are connected to the "+" and "−" terminals of a differential comparator 61 which influences a correction logic unit (CLU) 62 acting on a binary counter 63. A signal generator 64 is controlled by the higher weighted outputs Q6, Q5, Q4 of counter 63. A time base 60 assures synchronization of all the signals. The outputs G1 to G8 of the signal generator 64 are connected by switching groups 65a–65h to the emitting electrodes 1–32. Each switching group 65 is connected to four adjacent emitting electrodes, and hence N=4. In practice, it is advantageous to select N somewhat higher, on the order of 8 or more, so as to prevent the non-linear interpolation mentioned above.

The signal generator 64 has 2N outputs G1-G8, which is logical, because the embodiment described has a differential arrangement of receiving electrodes, where it is necessary to provide a signal configuration having a spatial period of about 2T, that is to say corresponding to 2N emitting electrodes.

Each switching group connects the emitting electrodes to the generator directly or by introducing a shift along the measuring direction. To this end, each switching group is controlled by one of the lower weighted outputs Q3, Q2, Q1 of the binary counter 63. Output Q3 (weight equal to 4) is connected to four switching groups 65b, c, f, g; output Q2 (weight equal to 2) is connected to two switching groups 65d, e; output Q1 (weight equal to 1) is connected to one switching group 65h. Finally, the remaining switching group 65a has its control input connected to ground. It will be seen that the number of switching groups 65 providing a shift of the distribution of the signals corresponds to the binary state of the three lower weighted outputs Q3, Q2, Q1 of computer 63. The sequence of connection of the groups 65a–h is chosen to minimize the influence on the measuring of geometrical errors, for example a lack of parallelism between scale and slide.

There is thus obtained, by a purely digital interpolation, a measuring interval M times smaller than what would be if the electrodes were connected, by periodic groups of 2N directly to the generator 64.

FIG. 2 shows by way of example the truth table of the logical states of the outputs G1 to G8 of a signal generator as a function of the inputs Q6, Q5, Q4 coming from the binary counter; the modulation input MOD (FIG. 1) used to modulate the outputs of the signal generator is taken to be at the "zero" state; at the "one" state the outputs G1 to G8 would be reversed.

If the outputs G1 to G8 of the signal generator 64 were directly connected to the emitting electrodes 1 to 32, there would be obtained a spatial periodic signal distribution modulated on these electrodes 1 to 32, and the passage of one state of the outputs of the generator to the following would shift this spatial distribution by an increment equal to T/N, i.e. the pitch of the emitting electrodes along the measuring direction.

Figure 3:
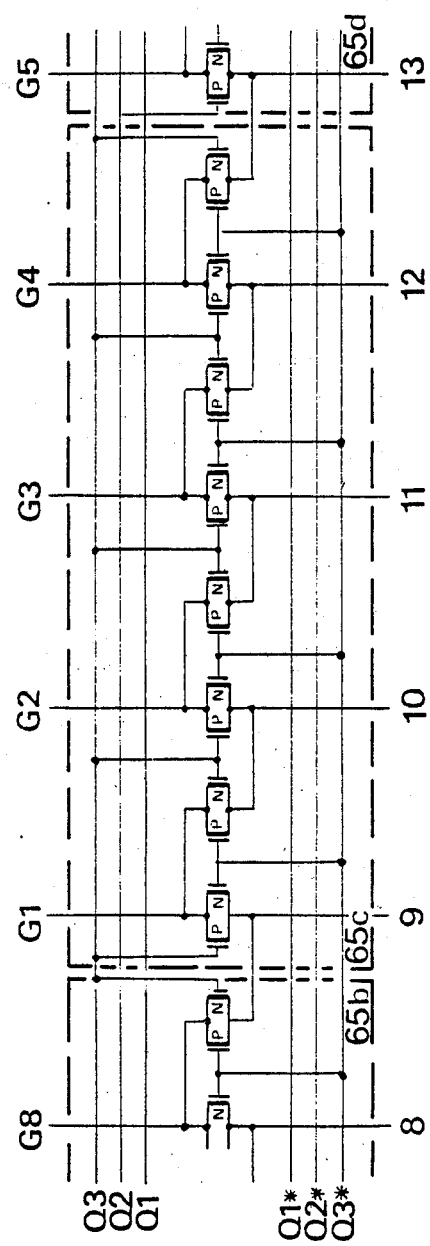
FIG. 3 shows the detailed diagram of a switching group.

FIG. 3 shows an embodiment, in CMOS technology, of a switching group 65c, and of its interconnection with N signals G1 to G4 of the signal generator 64, with a group of electrodes 9-12, with the adjacent switching groups 65b, 65d, and with the control signals Q3, Q2, Q1 and their complements Q3*, Q2*, Q1*. The N-type field effect transistors conduct when they are controlled by a logic state "1", whereas those of the P-type conduct when they are controlled by a logic state "0". An analysis of the circuit will show that if, for the switching group 65c, output Q3 is at logic state 1, the switching group shifts the signals one increment.

FIG. 4 shows some signal configurations on the emitting electrodes as a function of the state of the outputs Q6 to Q1 of the binary counter 63.

The series of emitting electrodes is shown schematically with the configuration of two signals modulated in opposite phase. Electrodes 1-32 comprising one signal are left blank, whereas those comprising the other signal are black, so as to give an image of the incremental displacement of the signal configuration as a function of the states of the outputs Q6 to Q1 of counter 63.

It will be seen that between two consecutive states, the mean configuration is shifted, and that M=8 increments of the counter are necessary for reconstructing the original configuration shifted by one electrode, thus of T/N in the measuring direction, thus giving a digital increment of T/(M·N).

It is evident that the selection sequence of the switching groups may be different than that shown in FIG. 4, given by the connections of the switching groups 65a to 65h to the outputs Q3, Q2, Q1 of the counter 63. For example, the binary outputs Q3, Q2, Q1 for each switching group could be decoded, which would permit a greater possible choice of sequences.

The control electronics, particularly the correction logic unit 62, may be implemented for different methods of acquisition of the signal. For example, the output state of the comparator, taking account of the modulation phase, may serve to correct the state of the counter 63 upward or downward; in this case the counter 63 is an up/down counter, and the state about which the counter 63 will be stabilized will give the measure of displacement. There is thus provided an electronic control, the configuration of signals on the emitting electrodes 1-32 "tracking" the displacement of the receiving electrodes 51, 52 of the scale.

An object of the invention being to reduce the analog portion of the electronics, the absence of filtering means may cause a random digital output of the comparator about the equilibrium point. As a function of the desired resolution of the signal, it is nonetheless possible to digitally filter the succession of the states of the output of the counter 63, for example by taking the mean of several successive states.

The state of the counter 63 may similarly be modified by two counting up/down counting inputs, one fine, the other coarse, so as to better follow rapid displacements.

Finally, it is also possible to generate a signal configuration that is continuously displaced along the direction of measurement, by incrementing the counter 63 at a constant rate; the signal of comparator 61 is then demodulated, and the phase variation of this demodulated signal is thus proportional to the displacement.

The description of the sensor according to the invention has been made in connection with measuring linear displacements; it is clear that the same principle may be applied to an equivalent relatively planar or cylindrical sensor. It is also clear that the definitions "slide" and "scale" have been used for clarity, but that the functions of the "slide" and "scale" may be reversed without departing whatsoever from the principle of the invention.

I claim:

1. Capacitive sensor for measuring a displacement between a scale and a slide movable relative to one another and facing each other, the scale comprising a series of receiving electrodes having a pitch T along the direction of displacement, the slide comprising a series of emitting electrodes having a pitch T/N in the direction of displacement, characterized in that the series of emitting electrodes is electrically divided in M groups of N adjacent electrodes, signal generator means having, said outputs having ZN signal configurations, 2N outputs for generating on each group one of two signal distributions each having the same spatial period, the first signal distribution being that obtained by connecting N of the outputs of said signal generator means directly to said emitting electrodes, the other signal distribution being derived from the first signal distribution by switching groups connected between each group of electrodes and the outputs of said generator means, said switching groups shifting the first signal distribution along the direction of displacement, and a control circuit being provided for weighting each group and for switching each group from one signal distribution to the other, whereby when a signal distribution overlaps into an adjacent group following shifting, the distribution is governed by the weighting provided by said control circuit, thus providing preference between overlapped signal distributions.

2. Sensor according to claim 1, characterized in that electronic control means adjust the signal generator outputs and the control inputs of the switching groups, so as to have the resulting signal configuration on the emitter electrodes on the slide track the relative displacement of the receiving electrodes on the scale.

* * * * *

UNITED STATES PATENT AND TRADEMARK OFFICE
CERTIFICATE OF CORRECTION

PATENT NO. : 4,841,225
DATED : June 20, 1989
INVENTOR(S) : Hans Ulrich MEYER

It is certified that error appears in the above—identified patent and that said Letters Patent is hereby corrected as shown below:

Column 4, lines 45-46, delete "ing, said outputs having 2N signal configurations, 2N outputs" and insert --ing 2N outputs, said outputs having 2N signal configurations,--.

Signed and Sealed this

Fifth Day of June, 1990

Attest:

HARRY F. MANBECK, JR.

Attesting Officer

Commissioner of Patents and Trademarks